United States Patent [19]

Lumpkin

[11] Patent Number: 5,564,531
[45] Date of Patent: Oct. 15, 1996

[54] ADJUSTABLE BRAKE ARM AND SHOE MOUNT FOR A CYCLE BRAKE

[75] Inventor: Wayne R. Lumpkin, Littleton, Colo.

[73] Assignee: Avid Enterprises, Inc., Englewood, Colo.

[21] Appl. No.: 552,372

[22] Filed: Nov. 3, 1995

[51] Int. Cl.⁶ ..................................................... B62L 1/08
[52] U.S. Cl. .................... 188/24.19; 188/24.12; 188/24.21
[58] Field of Search ............................ 188/24.21, 24.19, 188/24.22, 196 M, 24.12, 24.11, 24.13, 196 V, 196 F

[56] References Cited

U.S. PATENT DOCUMENTS

| | | | |
|---|---|---|---|
| 3,811,541 | 5/1974 | Yoshikawa | 188/24.21 |
| 4,546,858 | 10/1985 | Nagano | 188/24.22 |
| 4,553,641 | 11/1985 | Scott et al. | 188/24.22 |
| 4,754,853 | 7/1988 | Nagano | 188/24.19 |
| 4,765,443 | 8/1988 | Cunningham | 188/24.19 |
| 4,938,318 | 7/1990 | Ishibashi | 188/24.19 |
| 5,058,450 | 10/1991 | Yoshigai | 188/24.21 |
| 5,082,092 | 1/1992 | Yoshigai | 188/24.21 |
| 5,103,938 | 4/1992 | Yoshigai | 188/24.21 |
| 5,117,948 | 6/1992 | Yoshigai | 188/24.21 |
| 5,133,432 | 7/1992 | Yoshigai | 188/24.21 |
| 5,152,377 | 10/1992 | Yoshigai | 188/24.21 |
| 5,277,277 | 1/1994 | Yoshigai | 188/24.21 |
| 5,293,964 | 3/1994 | Li | 188/24.21 |
| 5,320,199 | 6/1994 | Min | 188/24.19 |
| 5,373,918 | 12/1994 | Nagano | 188/24.21 |
| 5,390,767 | 2/1995 | Nagano et al. | 188/24.21 |
| 5,413,193 | 5/1995 | Miller | 188/24.19 |
| 5,431,257 | 7/1995 | Rocca et al. | 188/24.21 |
| 5,469,939 | 11/1995 | Chen | 188/24.21 |
| 5,484,032 | 1/1996 | Li | 188/24.21 |

FOREIGN PATENT DOCUMENTS

| | | | |
|---|---|---|---|
| 0369968 | 1/1907 | France | 188/24.21 |
| 0933524 | 4/1948 | France | 188/24.21 |
| 1075997 | 10/1954 | France | 188/24.21 |
| 0643496 | 7/1962 | Italy | 188/24.21 |
| 5229473 | 9/1993 | Japan | 188/24.19 |
| 0179277 | 5/1922 | United Kingdom | 188/24.21 |
| 050024 | 2/1939 | United Kingdom | 188/24.21 |

Primary Examiner—Douglas C. Butler
Attorney, Agent, or Firm—Swanson & Bratschun L.L.C.

[57] ABSTRACT

A brake for a cycle includes a pair of brake arms each having a cylindrical section received in a through of mounting piece, the brake arms being movable axially and radially within the through and securable at a select position within the through. A brake pad attachment having a distal end and a substantially cylindrical proximal end is received in a bore in the brake arm. The bore has an axis substantially perpendicular to an axis of the cylindrical portion of the brake arm. The brake pad attachment is rotatable axially within the bore. The distal end of the brake pad attachment has a cylindrical hole with an axis perpendicular to an axis of the cylindrical proximal end, the cylindrical hole being sized to axially receive a brake pad post of a brake pad assembly. A clamp is operatively associated with each brake arm for securing the brake pad attachment at a select rotated position within the bore. Another clamp is operatively associated with each brake pad attachment for clamping the brake pad post received in the cylindrical hole of the brake pad attachment in a select position axially and radially.

7 Claims, 2 Drawing Sheets

ADJUSTABLE BRAKE ARM AND SHOE MOUNT FOR A CYCLE BRAKE

BACKGROUND OF THE INVENTION

1. Technical Field

The present invention is directed to a brake arm and pad mount for a bicycle brake, and more particularly toward an adjustable brake arm and brake shoe mount for a cantilever brake.

2. Background Art

There are two common types of brake shoes for bicycles. One is known as a cantilever brake and the other is known as a caliper brake.

A cantilever brake generally includes a pair of arms mounted pivotally at their lower ends to a pair of bosses that are attached to a bicycle fork or frame on both sides of a wheel at a height below the wheel rim. The brake arms are connected by a straddle cable at their top ends. A brake pad or shoe is mounted to each arm at the height of and in facing relation to the rim. During actuation of the brake, the straddle cable is pulled by a brake cable attached to a remote lever on the handle bar which causes the brake arms to swing toward each other and thus the brake pad to contact the rim.

A caliper brake generally includes a pair of arms pivotally mounted at their intermediate portions to a pair of bosses attached to a bicycle fork or frame on both sides of a wheel at a height above the wheel rim. A brake pad is mounted to each arm at its lower end in facing relation to and at a height of the rim. On a center-pull type cantilever brake, the top portions of the arms criss-cross each other and are connected by a straddle cable at their top ends. A brake cable is connected at one end to the straddle cable and at the other end to a remote lever mounted on a handle bar of the bicycle. Actuation of the brake lever pulls the mid-point of the straddle cable and causes the upper ends of the brake arms to swing toward each other causing the brake pads to make contact with the rim. Caliper brakes also include cam-operated caliper brakes and parallelogram-linkage-operated type caliper brakes which will not be discussed in detail. The key point to understand is that cantilever brakes and all types of the caliper brakes function by placing a brake pad into contact with the rim of a bicycle.

When brake pads are not aligned to engage a wheel rim with the pad braking surface flush, proper braking performance is inhibited and the rider of the bicycle is at serious risk. Proper brake pad alignment can be achieved by a non-adjustable mounting mechanism if the brake assembly is to be used on a particular bicycle with a particular wheel rim. However, since different makes and models of bicycles differ in their brake boss positioning and wheel rims vary in their widths and the angle of the side walls of the rims, an adjustable mounting mechanism is necessary to allow brakes to be used on a variety of bicycle models using different rims. Further, even if a brake assembly is to be used only on a specific bicycle model with a specific rim, the brake pads still need to be adjusted to compensate for wear resulting from repeated normal use.

In view of the many advantages of an adjustable brake pad mount, they are commonly used with bicycle brakes. A typical mounting mechanism known in the art comprises a bolt reception bore penetrating through a shoe support portion of a brake arm length-wise of the bicycle and a support bolt loosely inserted through the bolt reception bore. The support bolt has a threaded end projecting from one end of the bolt reception bore for engagement with a nut, and an enlarged end or head projecting from the other end of the bore. The bolt head is formed with a cross bore extending transversely of the bolt. The brake pad assembly has a brake pad post inserted into the bolt cross bore.

With the pad mounting structure described above, when the nut is tightened, the brake pad post of the brake pad assembly is pressed transversely against the bolt cross bore, thereby fixing the shoe relative to the brake arm. When the nut is loosened, the support bolt and the brake pad post become loose for adjusting movement or rotation. For example, the brake pad post may be slidingly moved relative to the bolt cross bore for horizontal adjustment toward or away from the wheel rim, the brake pad post being further rotatable within the bolt cross bore about its axis for orientation adjustment. Moreover, the support bolt may be rotated within the bolt reception bore for a second orientation adjustment. If necessary, the bolt reception bore may be elongated vertically and cross-sectioned to provided vertical adjustment of the shoe position. This provides for adjustment of the degrees of pad movement, known as the "degrees of freedom".

For the sake of clarity, FIG. 1 illustrates the five degrees of pad adjustment freedoms will be defined as follows:

A. The "height"—the height of the pad relative to the rim;
B. The "toe"—the angle the pad abuts the rim relative to its length;
C. The "extension"—the axial position of the brake pad post relative to the brake arm;
D. The "twist"—the rotation of the brake pad post about its own axis; and
E. The "pad attitude"—the angle the pad abuts the rim relative to its width.

In the manner described above, the prior art brake pad mounting mechanism allows the brake pad to have five degrees of freedom and thus proper brake pad alignment to any rim on any bicycle. However, since the brake pad does not always require alignment in every degree of freedom, the multiple degrees of freedom are adjustable by loosening of a single bolt often causing extreme difficulty in actually aligning a brake pad. For example, if only the height needs to be adjusted by moving the support bolt within the reception bore, upon loosening the mounting nut, both the shoe post and the support bolt may come loose and may move unintentionally, thus nullifying all previous adjustments. In fact, it is usually necessary to readjust a brake pad in every adjusting freedom if any one of the freedoms is in need of alignment. Total realignment of all freedoms is inevitably required if the brake pad assembly is to be replaced.

Furthermore, when the mounting nut is tightened to secure the brake pad, the support bolt can tend to rotate unpredictably with the torque applied to the nut and thus can throw the brake pad out of alignment which has just been painstakingly achieved. Consequently, the brake pad is to be repeatedly aligned until by chance the support bolt happens not to rotate with the torque applied to the nut. Moreover, since the brake post and the support bolt become loose in their bores at the instant the mounting nut is loosened, the prior art mounting mechanism does not allow for incrementally adjusting the brake pad for fine tuning the alignment. Consequently, it is quite common for cyclists to lose patients in adjusting brake pads, thus increasing the risk that users will leave the brake pads improperly adjusted while riding the bicycle, increasing the risk of injury.

In view of these adjustment problems, at least three improvements to the prior art brake pad mechanisms have been proposed. One of the improvements is disclosed in Japanese Utility Model Publication No. 55-47740 and comprises a pressure plate that mounts on the support bolt between the pad post and the pad mounting portion and presses directly on the pad post via the force of a compression of a coil spring accommodated in a recess of the pad mounting portion of the brake arm.

Upon loosening the mounting nut of the mechanism for adjustment, since the compression spring constantly urges the pressure plate into pressing contact with the pad post and thus holding it against the cross bore of the support bolt, the movement of the pad post relative to the cross bore is frictionally restrained. On the other hand, the pad post may be forcibly adjusted if sufficient manual force is applied to overcome the friction imparted to it via the compression spring. Thus, this mechanism allows the height, toe and attitude to be adjusted without affecting the extension and twist, thereby simplifying the adjusting operation while retaining the benefits of the diverse freedoms.

However, the pressure plate, being merely pressed against the pad post via the compression spring, may be moved away from the pad post if an operator's finger accidentally presses down on the pressure plate while making adjustments. The pad post is then put back into its loose state relative to the cross bore and results in the same problem as described above in connection to the typical prior art.

Another improvement is proposed in U.S. Pat. No. 4,938,318 to Ishibashi. This improvement includes a pad post retainer that slips over the cross bore of the support bolt to be provided with a post retaining hole for alignment with the cross bore for press-fitting the pad post on a brake pad assembly as inserted into the cross bore. Upon loosening the mounting nut of the above mechanism for adjustments, since the pad post retainer is press-fit into the pad post and is inseparable from it and the support bolt, the movement of the pad post relative to the cross bore is frictionally restrained by the post retaining hole. On the other hand, the post may be forcibly adjusted if sufficient manual force is applied to overcome the friction between it and the post retaining hole. Since this pad mounting mechanism allows the height, toe and attitude to be adjusted without affecting the extension and twist, it simplifies the adjusting operation in the same manner discussed above with respect to Japanese Utility Model Publication No. 55-47740.

However, the press-fitting of the post retaining hole to the pad post inevitably will deteriorate over repeated adjustments of the brake pad, thereby, the pad post is put into its loose state relative to the cross bore, resulting in the same problems described above in connection with the prior art.

Both of these improvements to prior art shoe mounting mechanisms discussed above offer no advantage when compensating for brake pad wear or replacing the brake pad, in which case it is the height, toe and attitude are proper and only the extension and twist need to be adjusted. For example, upon loosening the mounting nut for mounting the twist or extension, the support bolt immediately becomes loose in the reception bore and may move unintentionally and thus annul proper height, toe and attitude adjustments. Further, these improvements do not address the problems of torque induced annulment of the just made alignment of the brake pad when tightening the main nut, or the lack of incremental adjustability of the brake pad for fine-tuning its alignment to perfectly match the rim's braking surface.

An improvement over both of these structures in incorporated in the Tri-Align™ brakes sold by Avid Enterprises, Inc., assignee of the present invention. The Tri-Align™ brake isolates the extension and twist adjustments so that a brake pad can be readily removed without having to reset the height, toe and attitude. However, if a user is to adjust either of the height or toe, the attitude is subject to inadvertent adjustment. Because attitude is a critical adjustment and difficult to achieve, this is a disadvantage of the Tri-Align™ brake pad adjustment structure notwithstanding the Tri-Align™ brake pad adjustment structure's many improvements over the prior art.

One additional problem with prior art pad adjustment mechanisms is that typically the point of attachment of the brake arm to the brake attachment boss (known as the "fulcrum" herein) is fixed and the height of the pad is varied by raising and lowering a brake pad adjustment structure relative to the fulcrum. Each brake has an optimal distance between the brake pad and fulcrum. If the attachment boss is too high, the brake pad adjustment must be moved closer to the fulcrum, thereby increasing the amount of leverage, and giving the brake a "soft" feeling. Conversely, if the adjustment boss is too low relative to the rim, the brake pad attachment assembly must be moved up, increasing the length between the fulcrum and the point of contact, thereby decreasing the amount of leverage and therefore requiring more force to actuate the brake.

The present invention is directed toward overcoming one or more of the problems discussed above.

SUMMARY OF THE INVENTION

The present invention is a brake for attachment to a pair of attachment studs extending from a cycle frame, the brake moving brake pads of a brake pad assembly into and out of braking engagement with a rim of a wheel mounted to the cycle. The brake includes a pair of elongate brake arms, each brake arm having a cylindrical section along its length and means for attachment to a brake arm actuator. A brake arm mounting piece associated with each brake arm has a through axially receiving the cylindrical section of the brake arm. The brake arm is moveable axially and radially within the through. The brake arm mounting piece includes a structure for mounting to an attachment stud of a cycle frame. A clamp on the brake arm mounting piece permits the cylindrical section of the brake arm to be maintained at a select position axially and radially within the through. A brake pad attachment having a distal end and a substantially cylindrical proximal end is received in a bore in the brake arm. The bore has an axis substantially perpendicular to an axis of the cylindrical portion of the brake arm. The brake pad attachment is rotatable axially within the bore. The distal end of the brake pad attachment has a cylindrical hole with an axis perpendicular to an axis of the cylindrical proximal end, the cylindrical hole being sized to axially receive a brake pad post of a brake pad assembly. A clamp is operatively associated with each brake arm for securing the brake pad attachment at a select rotated position within the bore. Another clamp is operatively associated with each brake pad attachment for clamping a brake pad post received in the cylindrical hole of the brake pad attachment in a select position axially and radially. The clamp for securing the brake pad attachment, the clamp for clamping the brake pad post and the clamp for clamping the cylindrical section of the brake arm are preferably each independently operable. In a preferred form, the structure for attachment to a brake arm actuator is at one end of the brake arm and the cylindrical section is proximate the other end of the brake arm.

The present invention provides for isolation and ganging of the adjustments controlling the five degrees of brake freedom. Most importantly, adjustment of the brake pad attitude is controlled independently of adjustment of the brake pad height, toe, extension and twist. This provides a distinct advantage over prior art brake pad adjustment mechanisms because adjustment of the brake pad attitude is critical for proper brake operations and is very difficult to accomplish with prior art devices. The present invention further pairs the control of the remaining four degrees of freedom. Specifically pad height and toe can both be adjusted by a second control and pad extension and twist can be altered by means of a third independent control. Pairing of these adjustments by the present invention renders adjustment of any one of the five degrees of freedom a straight forward and simple task. That is, height is controlled by axial movement of the brake arm and toe is controlled by radial movement for axial rotation of the brake arm. Either such movement of the brake arm can be readily accomplished without requiring the other movement. Thus, height and toe, while accessed by the same control, can be changed independently. The same is true with respect to the extension and twist of the brake pad. Extension is achieved by axial movement of the brake pad post and twist is accomplished by rotation of the brake pad post about its axis. These adjustments can be made relatively independently.

The brake of the present invention further mitigates changes in brake arm leverage resulting from variations in placement of brake attachment studs to various models of bicycles. Furthermore, the mechanism for brake pad adjustment is mechanically simple and made from a small number of easily manufactured parts which are easy to assemble. It is therefore inexpensive.

DETAILED DESCRIPTION OF THE EMBODIMENT

Figure 1:
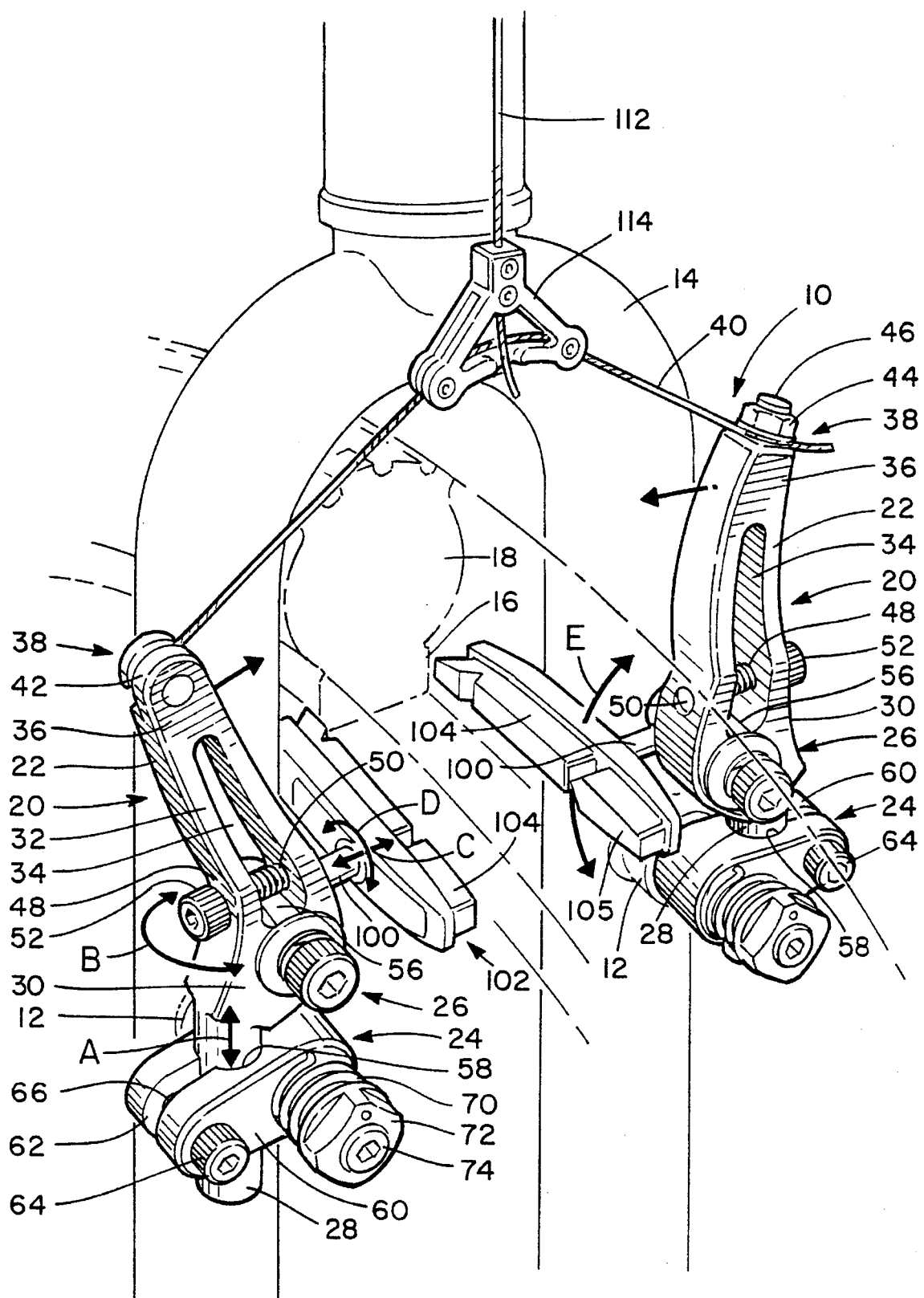
FIG. 1 is a perspective view of a brake in accordance with the present invention mounted to the front fork of a bicycle.

A cantilever brake 10 in accordance with the present invention is shown mounted to a pair of attachment studs 12 extending from the front fork 14 of a bicycle frame. A rim 16 and tire 18 of a bicycle wheel are shown in phantom lines illustrating the positioning of the cantilever brake 10 relative to the wheel rim 16. While the present invention is illustrated with a cantilever brake, its principles could be applied to the various types of caliper brakes as well.

The cantilever brake 10 consists of a pair of brake arm assemblies 20 which have essentially identical components and which are mirror images of each other. Each brake arm assembly 20 consists of a brake arm 22, a brake arm mounting piece 24 and a brake pad attachment 26.

The brake arm 22 consists of a cylindrical bottom portion 28, a central portion 30, a split portion 32 with an elongate void 34 between the splits and a top portion 36 having a structure 38 for attachment to a straddle cable 40. On one of the pair of brake arms the structure 38 for attaching straddle cable 40 is a barrel hook 42 and on the other the structure 38 is a nut 44 threadably engaging a threaded post 46 extending from the top of the top portion 36 for squeezing the end of the straddle cable between the nut and the top portion 36. A pair of coaxial securing holes 48, 50 are in each of the splits 32 on opposite sides of the void 34 near the bottom of the void 34. The securing hole 50 is threaded to threadably engage male threads on the bolt 52. Proximate the bottom of the elongate void 34 is a bore 54 best viewed in FIG. 2. A slot 56 extends between the bottom of the elongate void 34 and the bore 54 along the length of the bore 54.

The brake arm mounting piece 24 consists of a structure for receiving an attachment stud (not shown) attached to the attachment boss 12 in a conventional manner known in the art. The details of a representative form of this attachment are shown in applicant's co-pending U.S. patent application Ser. No. 08/471,720, filed Jun. 6, 1995. A brake arm receiving bore 58 is in the body 60 of the brake arm mounting piece 24 and a clevise 62 connects to the brake arm receiving bore 58. A bolt 64 spans the clevise 62 and is threadably engaged in a threaded hole 66.

A coil spring 70 is attached to the brake arm mounting piece body 60 and a brake tension adjuster 72. The coil spring 70 and spring tension adjuster 72 are held in place by the screw 74 which is received in a distal end of the attachment stud (not shown), as described in U.S. patent application Ser. No. 08/471,720. In this manner the return force on the brake arm 22 applied by the spring 70 can be adjusted.

Figure 2:
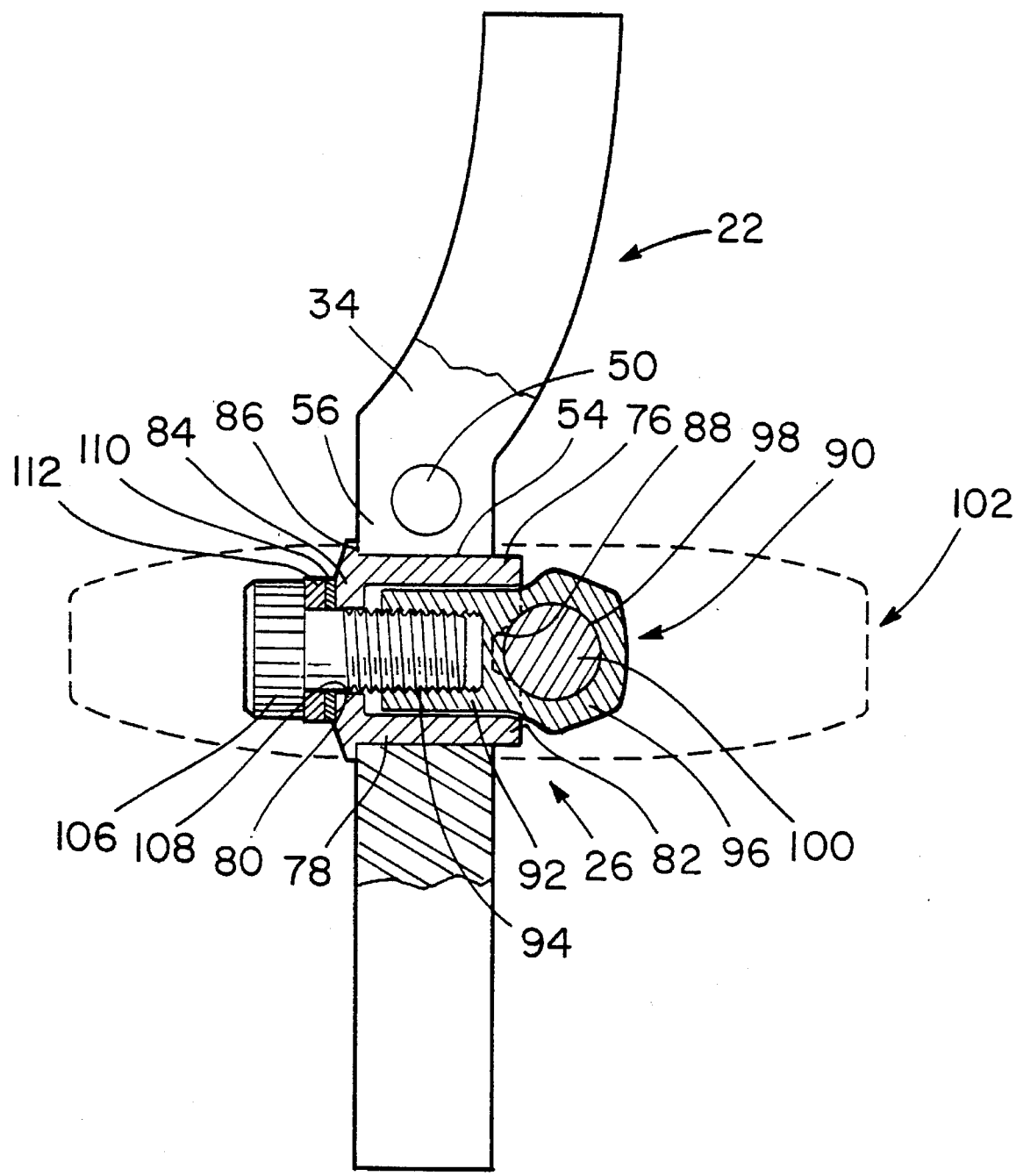
FIG. 2 is a side elevational view of a brake arm of the present invention in partial cross section.

The brake pad attachment 26 is best understood with reference to FIG. 2. The brake pad attachment 26 consists of a cylindrical sleeve 76 having a side wall 78 with a first open end 80 and a second open end 82. The first open end includes an annular inwardly extending engagement flange 84 and an annular outwardly extending flange 86. The second end 82 has a pair of notches 88 in the side wall 78 spaced apart 180°. The cylindrical sleeve 76 is axially received in the bore 54. An eye nut 90 has a proximal end or body 92 which is received in the second end of the cylindrical sleeve 78. The eye nut body 92 includes an internally threaded bore 94. The head 96 of the eye nut 90 has a cylindrical hole 98 sized to receive a brake pad post 100 of a brake pad assembly 102, the brake pad assembly 102 including a brake pad 104 having a braking surface 105. A bolt 106 is axially received in an orifice 108 defined by the annular inwardly extending engagement flange 84 and threadably engages the threaded bore 94 of the eye nut 90. An annular washer 110 and a lock washer 112 are "sandwiched" between the head of the bolt 106 and the annular inwardly extending engagement flange 84.

The brake 10 illustrated in FIG. 1 functions by the brake arms 22 being pivoted inward to bring the brake pads 104 into engagement with the rim 16 of the bicycle wheel. The brake arms 22 are actuated (i.e., pivoted inwardly) by tension applied to the brake cable 112 which is coupled to the straddle cable 40 by means of the straddle cable hanger 114. The distal end of the brake cable 112 is attached to and actuated by a brake lever on the handle bar of a bicycle as is well known by those skilled in the art.

As discussed in the Background of the Invention above, it is imperative that the brake pads 104 are positioned so that the face or braking surface 105 of the brake pads 104 are flush with the rim while braking. In order to accomplish this result, the brake arm assembly 20 of the present invention provides a unique pairing and isolation of adjustments of the necessary five degrees of freedom. More particularly, with the brake arms assembled as illustrated in FIG. 1, the height A and the toe B can be adjusted by loosening the bolt 64 and either raising or lowering the brake lever 22 by movement axially of the cylindrical bottom portion 28 or by rotating the brake arm 22 about the axis of the cylindrical bottom portion 28. The brake arm receiving bore 58 is sized to be slightly smaller in diameter than the diameter of the cylindrical bottom portion 28 so that friction between the surfaces prevents unforced movement between the pieces. It has been found that once the desired height A is achieved, toe B can be adjusted by axial rotation of the brake arm 22 without disturbing the height A. Thus, while the height A and toe B are both changed by loosening of the bolt 64 and then manipulation of the brake arm 22, the height A and toe B can be independently adjusted. Once the desired height A and toe B is achieved, the brake arm 22 is clamped in place by tightening the bolt 64 across the clevise 62.

The pad extension C and twist D can be changed by loosening the bolt 106 to cause the eye nut 90 to extend slightly from the second end 82 of the cylindrical sleeve 76. The pad extension can then be altered by pulling out or pushing in the brake pad post 100 relative to the head 96 of the eye nut 90. The twist D can be changed by rotating the pad post 100 about its axis. Once the desired extension C of twist D has been selected, the pad post 100 is secured against further axial or radial movement by tightening the bolt 106 which causes the body 92 of the eye nut 90 to be drawn into the second end 82 of the cylindrical sleeve 76 and compresses the brake pad post 100 against the second end 82 of the cylindrical sleeve 76. More particularly, the brake pad post 100 will become engaged within the notches 88 in the second end of the sleeve. In this manner, the extension C and twist D can be altered independently of the height A, toe B and attitude E. Furthermore, a brake pad assembly 102 can be readily replaced without altering the adjustments of the other degrees of freedom.

The pad attitude E is adjusted by loosening of the bolt 52 which spans the elongate void 34. Loosening the bolt 52 releases compression upon the cylindrical sleeve 76 and allows the cylindrical sleeve 76 to be rotated axially within the bore 54. Once a desired attitude is selected, the attitude can be held constant by tightening of the bolt 52 which compresses the elongate slot 34 and simultaneously compresses the bore 54 by virtue of the slot 56 between the elongate void 34 and the bore 54. It should be noted that the cylindrical sleeve 54 can be rotated sufficiently to accommodate any available degree of rim taper, and certainly the minus 3° to plus 9° of rim taper that is typically encountered. Once the select pad attitude is obtained and the cylindrical sleeve 54 is clamped in place in the manner described above, the pad post 100 will be repeatedly realigned to the proper attitude by being brought into engagement with the notches 88 in the second end 82 of the cylindrical sleeve 76.

The brake 10 is able to accommodate a wide range of placements of attachment bosses relative to rims 16 because the brake arms 22 can be raised or lowered over the length of the cylindrical bottom portion 28. If the attachment boss is too high, the brake arm 22 must be moved downward relative to the brake arm mounting piece 24. Because the brake pad post 100 is thereby brought closer to the brake arm fulcrum (i.e., the point of attachment to the attachment boss), leverage is increased. However, simultaneously the length of the lever arm (i.e., the distance between the fulcrum and the point of attachment of the straddle cable 40) is decreased, which diminishes the leverage advantage obtained by moving the brake pad post 100 closer to the fulcrum. This feature allows the brakes to maintain a more constant feel as brakes are adjusted to accommodate attachment bosses at different heights. Conversely, if the brake boss is too low relative to the rim, the effective length of the brake arm 22 is increased because the distance between the fulcrum and the point of attachment of the straddle cable increases., which increases the brake leverage. However, the distance between the brake pad post 100 and the fulcrum also increases as the brake pad attachment is moved up to bring the brake into attachment with the rim, which acts to decrease the amount of leverage. Thus, regardless of whether the attachment boss is above or below the optimal point, variations are minimized by the brake arm design.

What is claimed is:

1. A brake for attachment to a pair of attachment studs extending from a cycle frame, the brake moving brake pads of a brake pad assembly into and out of braking engagement with a rim of a wheel mounted to the cycle, the brake comprising:

a pair of elongate brake arms, each brake arm having a cylindrical section along its length and means for attachment to a brake arm actuator;

a brake arm mounting piece having a through axially receiving the cylindrical section of the brake arm, the brake arm being movable axially and radially within the through, the brake arm mounting piece including means for engaging an attachment stud of a cycle frame and means for clamping the cylindrical section of the brake arm at a select position axially and radially within the through;

a brake pad attachment for each brake arm, the brake pad attachment having a distal end and a proximal end, the proximal end being substantially cylindrical and received in a bore in the brake arm, the bore having an axis substantially perpendicular to an axis of the cylindrical portion of the brake arm, the brake pad attachment being rotatable axially within the bore and the distal end having a cylindrical hole with an axis perpendicular to an axis of the cylindrical proximal end, the cylindrical hole being sized to axially receive a brake pad post of the brake pad assembly;

means operatively associated with each arm for securing the brake pad attachment at a select radial position within the bore; and means operatively associated with each said brake pad attachment for clamping the brake pad post of the brake pad assembly received in the cylindrical hole of the brake pad attachment in a select position axially and radially.

2. The brake of claim 1 wherein the means for securing the brake pad attachment, the means for clamping the brake pad post of the brake pad assembly and the means for clamping the cylindrical section of the brake arm are each independently operable.

3. The brake of claim 1 wherein the cylindrical section of the brake arm is at one end of the brake arm and the bore in the brake arm is spaced from the cylindrical section.

4. The brake of claim 2 wherein the means for securing the brake pad attachment comprises a split in the brake arm, the split extending into the bore along the length of the bore, coaxial securing holes on both sides of the split in the brake arm, a bolt received in the securing hole and means threadably engaging the distal end of the bolt on one side of the split, whereby the split and thereby the bore can be compressed by tightening of the bolt.

5. The brake of claim 1 wherein the means for attachment to the brake arm actuator is at one end of the brake arm and the cylindrical section is at the other end of the brake arm.

6. The brake of claim 1 wherein the brake pad attachment comprises:

a sleeve having a cylindrical side wall with first and second open ends, the first end having an annular inwardly extending engagement flange and the second end having a pair of notches in the side wall spaced about 180 degrees, the sleeve being axially received in the slot;

an eye member having a body and a head, the body being axially received in the second end of the sleeve and the head having the cylindrical hole; and means for engaging the body of the eye member and selectively drawing the body into the sleeve and extending the body from the sleeve, whereby the brake pad post received in the cylindrical hole will be engaged by the notches in the sleeve as the eye member body is drawn into the sleeve to orient the brake pad post to a select position relative to the sleeve.

7. The brake of claim 6 wherein the means for securing the brake pad attachment comprises a split in the brake arm, the split extending into the bore along the length of the bore, coaxial securing holes on both sides of the split in the brake arm, a bolt received in the securing hole and means threadably engaging the distal end of the bolt on one side of the split, whereby the split and thereby the bore can be compressed by tightening of the bolt to clamp onto the side wall of the sleeve to maintain the sleeve in a select radial orientation.

* * * * *